United States Patent [19]

Taylor et al.

[11] Patent Number: 4,549,127
[45] Date of Patent: Oct. 22, 1985

[54] BATTERY CHARGING

[75] Inventors: Andrew J. Taylor; Philip J. McGillvray, both of Cowes, England

[73] Assignee: Electronic Designs (I.W.) Limited, Cowes, England

[21] Appl. No.: 586,064

[22] Filed: Mar. 5, 1984

[30] Foreign Application Priority Data

Mar. 4, 1983 [GB] United Kingdom ............... 8306071

[51] Int. Cl.⁴ ............................................ H02J 7/10
[52] U.S. Cl. .................................... 320/21; 320/14; 320/39
[58] Field of Search ................ 320/20, 21, 39, 40, 320/14

[56] References Cited

U.S. PATENT DOCUMENTS

| | | | |
|---|---|---|---|
| 3,936,718 | 2/1976 | Melling et al. | 320/21 X |
| 3,944,904 | 3/1976 | Hase | 320/21 X |
| 4,118,661 | 10/1978 | Siekierski et al. | 320/40 |
| 4,302,714 | 11/1981 | Yefsky | 320/39 X |
| 4,342,954 | 8/1982 | Griffith | 320/21 X |

Primary Examiner—R. J. Hickey
Attorney, Agent, or Firm—Arnold, White & Durkee

[57] ABSTRACT

A battery charger comprises a power supply for supplying current pulses to a battery to be charged. A microprocessor receives from an analog-to-digital converter codes representing the voltage between the battery terminals with the battery off-load between charging pulses and monitors the ratio of the voltage difference ($V_3-V_5$) during a first period following a charging pulse to the voltage difference ($V_{10}-V_{12}$) over a second period following the charging pulse, with the second period ending after the beginning of the first period. The value of this ratio reaches a peak value and then declines, and the microprocessor determines when the value of the ratio falls below a peak value thereof by a predetermined amount to terminate fast charging of the battery, after which the battery may be removed or may remain on a trickle charge. An accurate, reliable, and consistent determination of completion of charging of sealed nickel-cadmium batteries is thus provided.

20 Claims, 17 Drawing Figures

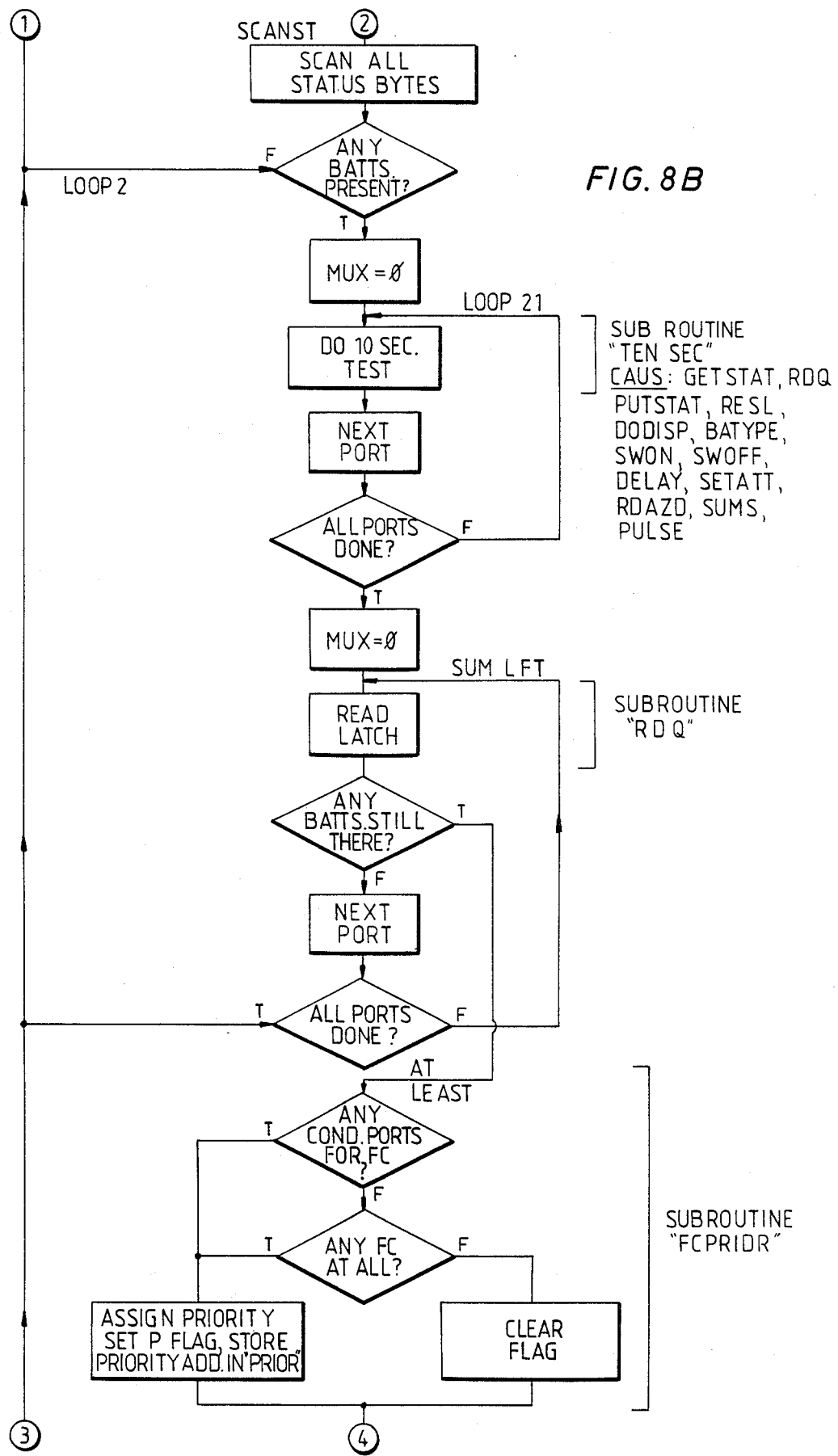

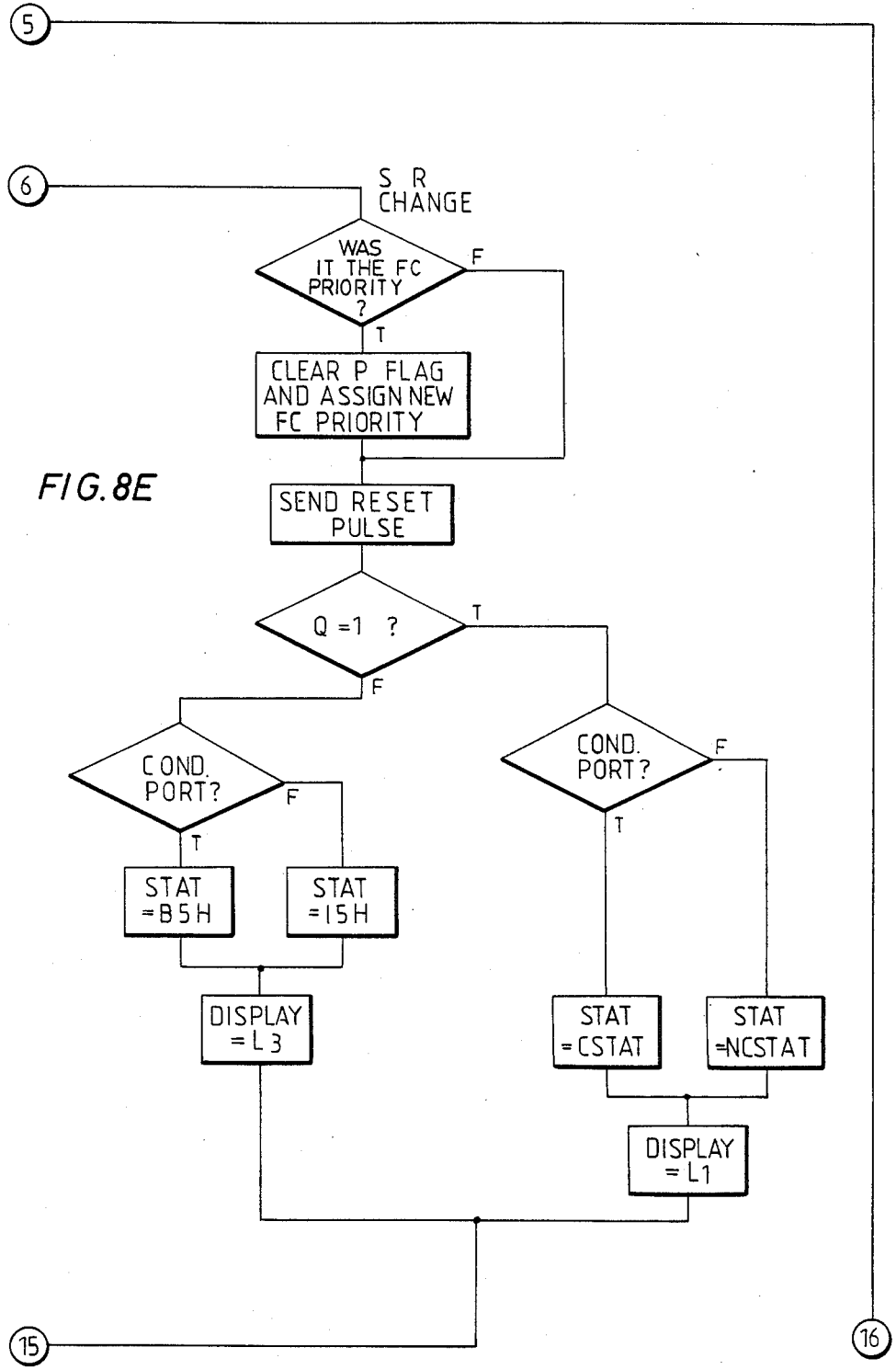

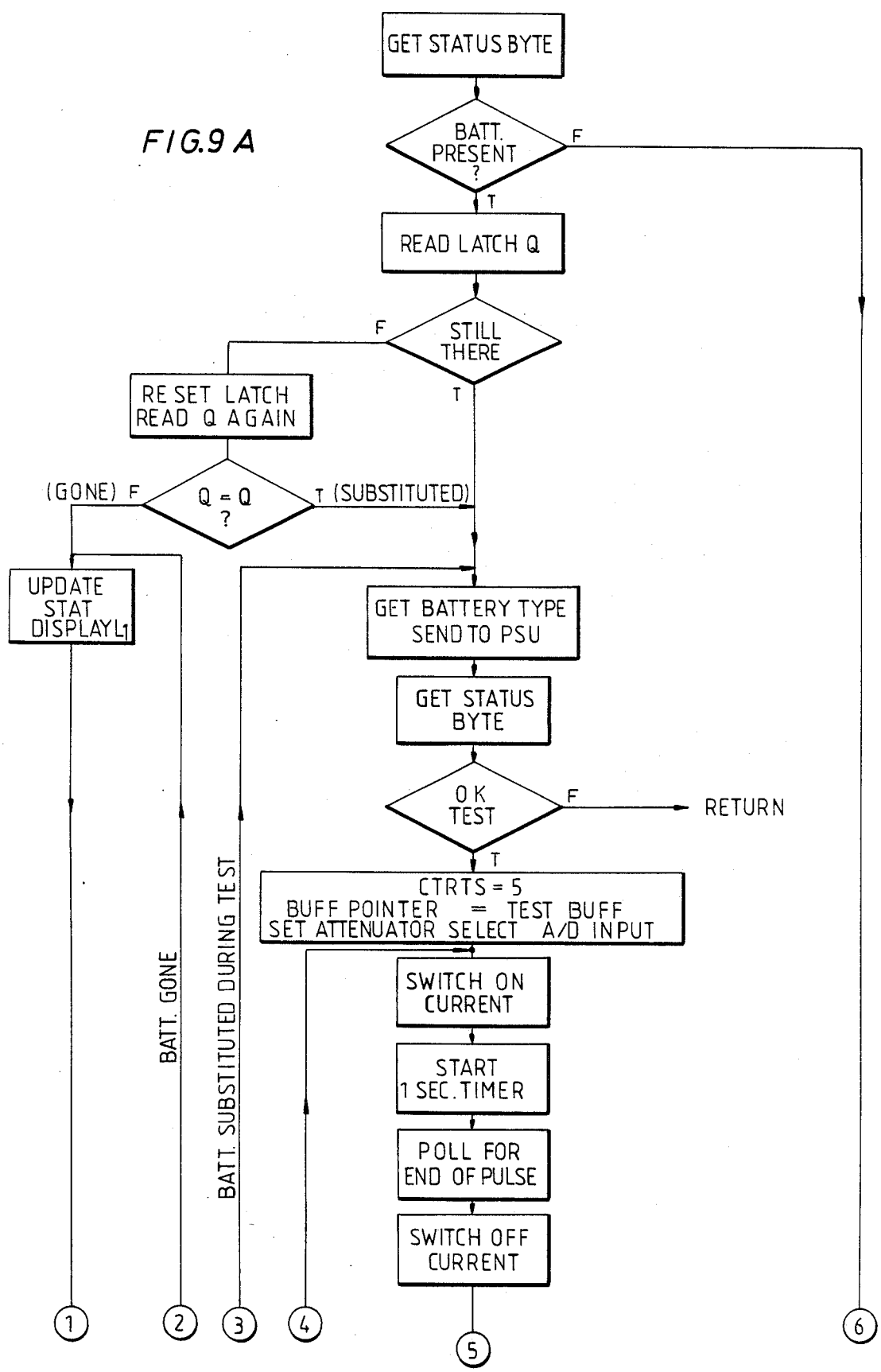

BATTERY CHARGING

The present invention relates to battery charging and, in particular, to charging of sealed nickel-cadmium (Nicad) batteries.

According to a first aspect of the invention, there is provided a method of charging a battery, comprising the steps of:

(a) supplying a plurality of current pulses of a first type to the battery;

(b) measuring the off-load voltage of the battery between current pulses of the first type;

(c) determining a first voltage drop during a first period following a current pulse of the first type;

(d) determining a second voltage drop during a second period following the current pulse of the first type of step (c) but before a next current pulse of the first type, where the end of the second period is later than the beginning of the first period;

(e) determining the ratio of the first and second voltage drops;

(f) repeating steps (c) to (e) for subsequent current pulses of the first type to form a sequence of ratios; and (g) stopping the supply of the current pulses of the first type after the sequence of ratios has reached a peak value and when a ratio is determined which is less than the peak value by a predetermined amount or proportion.

According to a second aspect of the invention, there is provided an apparatus for charging a battery, comprising: means for supplying current pulses of a first type to the battery; means for measuring the off-load voltage of the battery between current pulses; and means for determining each first voltage drop during a first time period following a current pulse, for determining each second voltage drop during a second period following the current pulse with the end of the second period following the beginning of the first period, for determining the ratios of the first and second voltage drops, and for preventing the pulse supplying means from supplying current pulses of the first type when the value of the ratio falls below a peak value by a predetermined amount or proportion.

Various preferred features and embodiments of the invention are defined in claims which are dependent on claims 1 and 16.

The invention will be further described, by way of example, with reference to the accompanying drawings, in which.

Figure 7A:
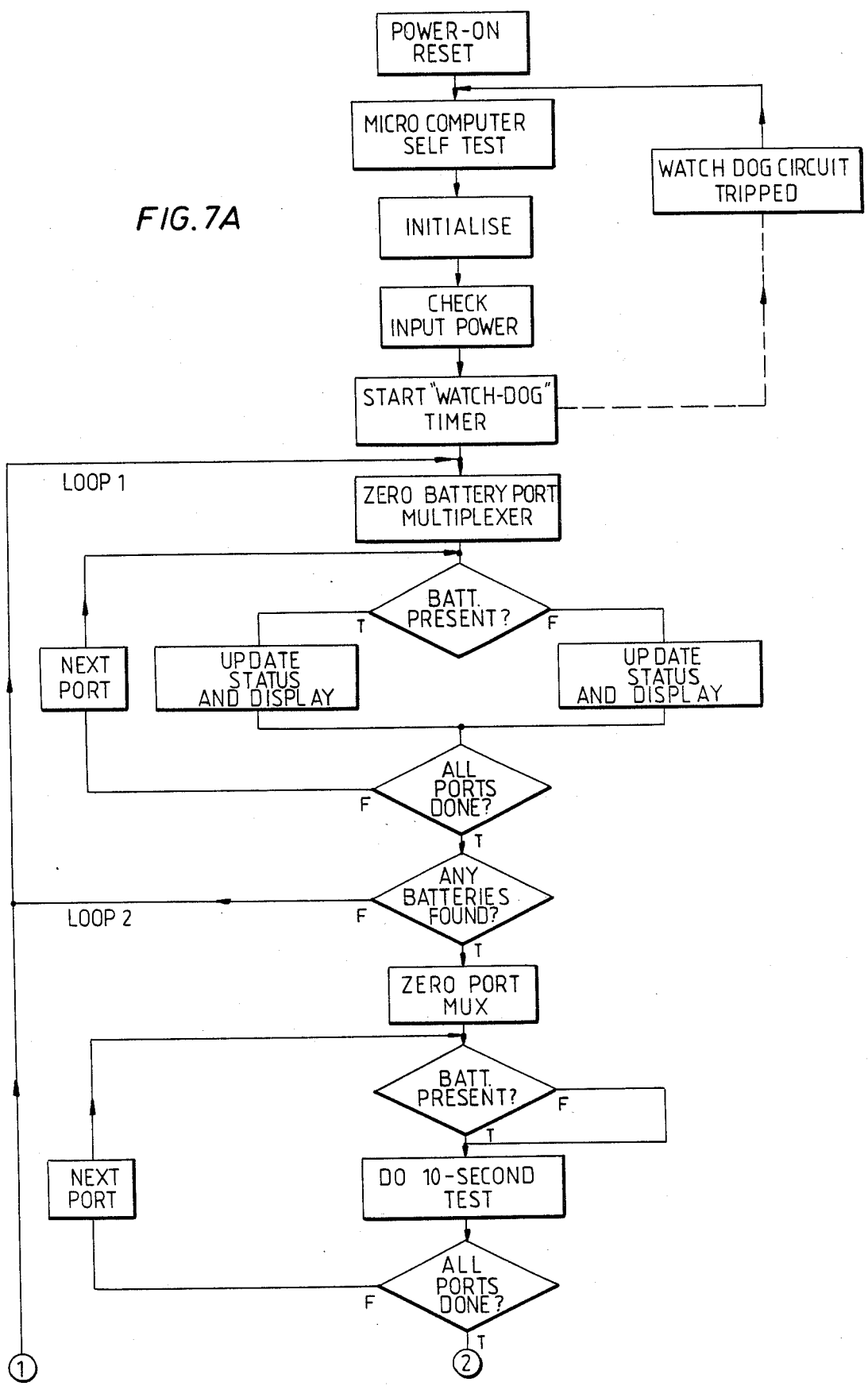
Figure 7B:
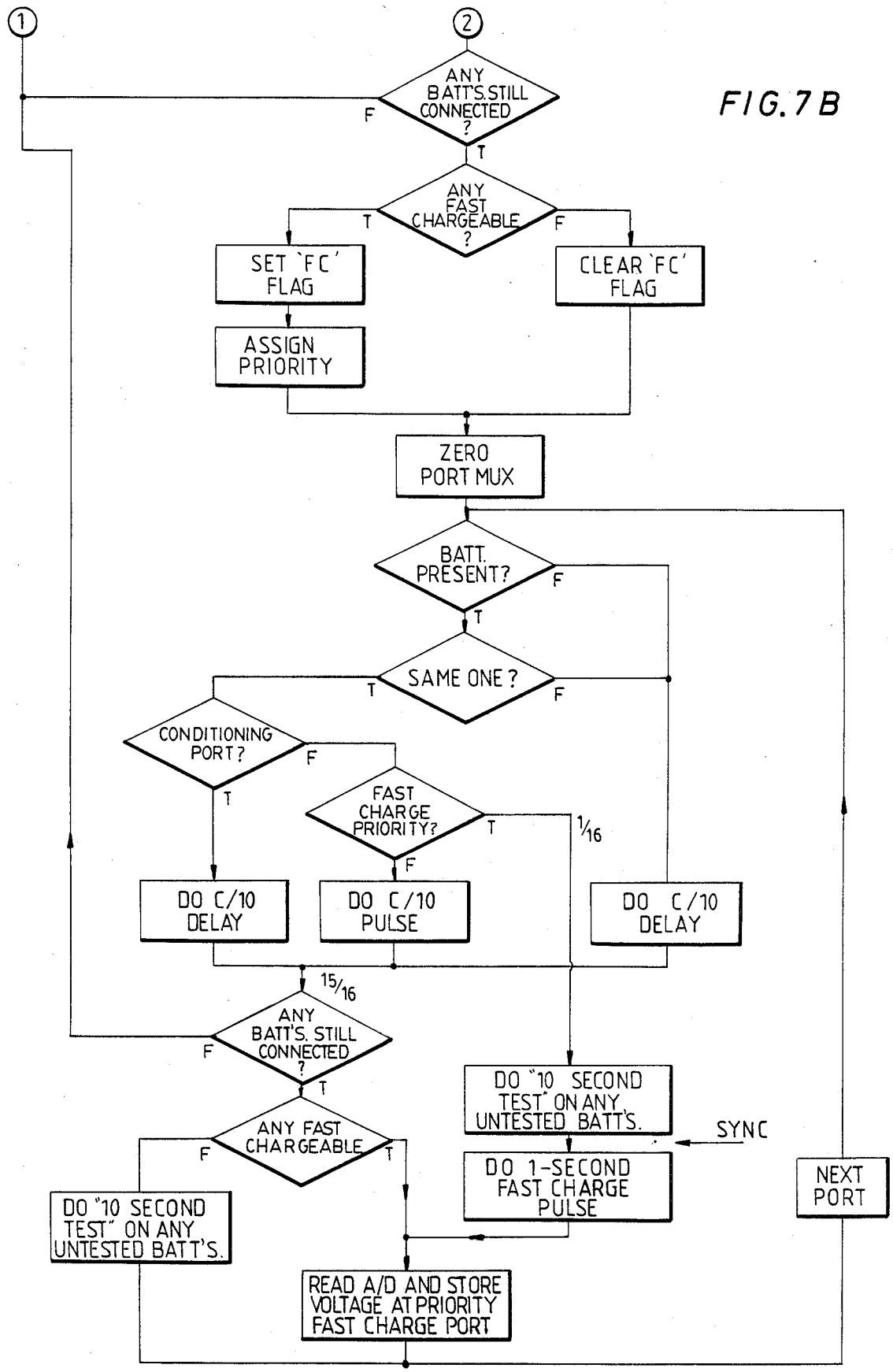
Figure 8A:
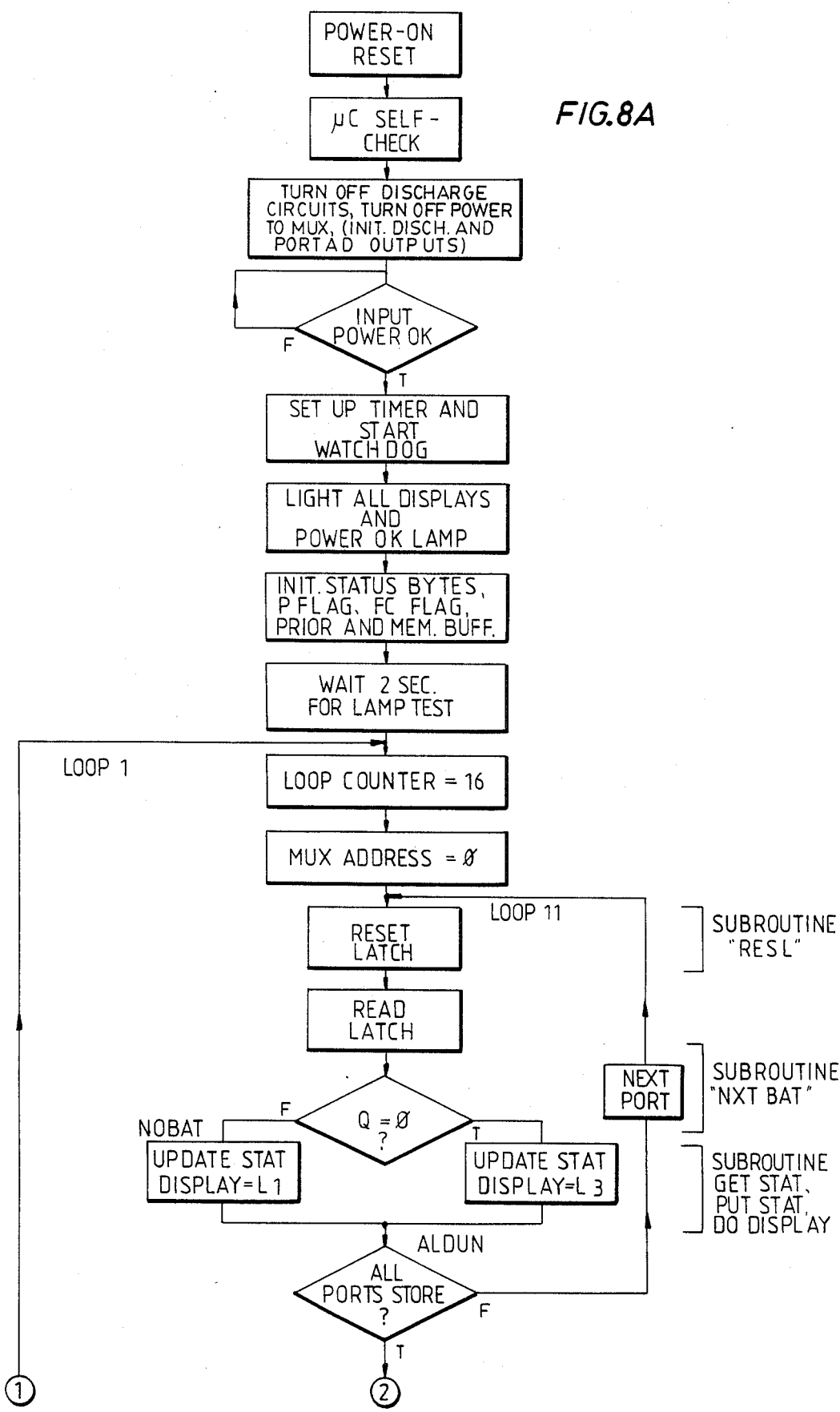
Figure 8C:
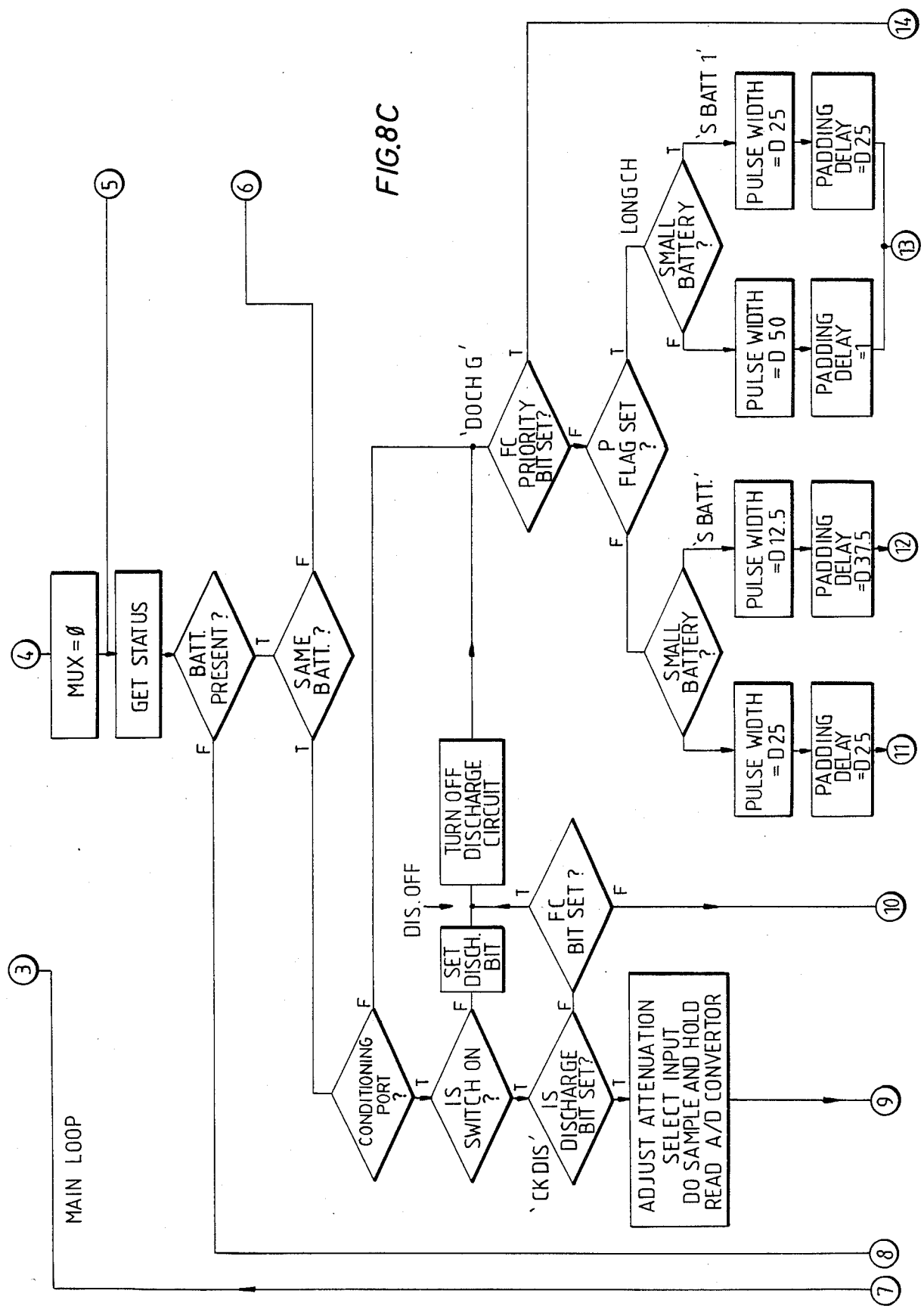
Figure 8D:
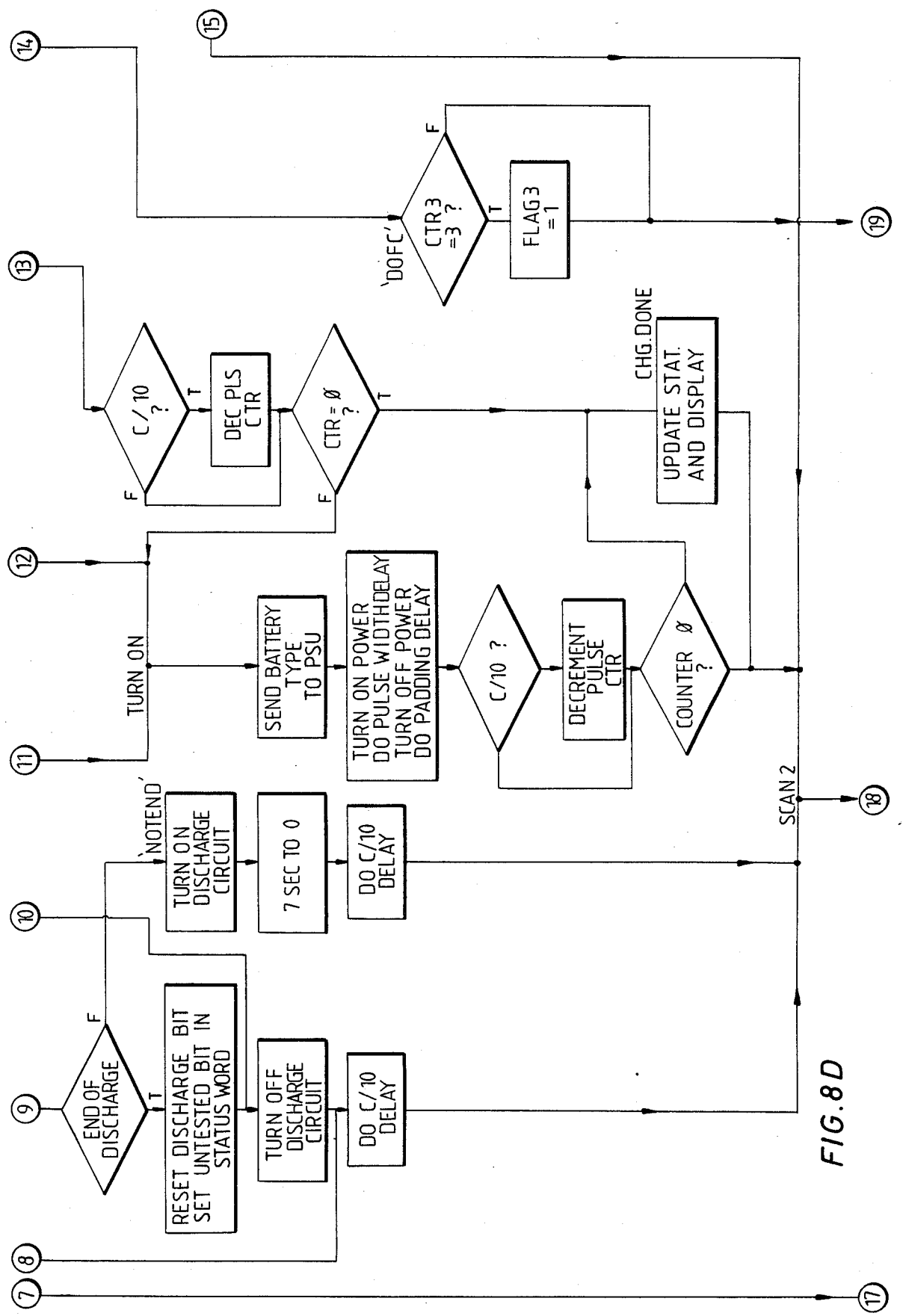
Figure 8F:
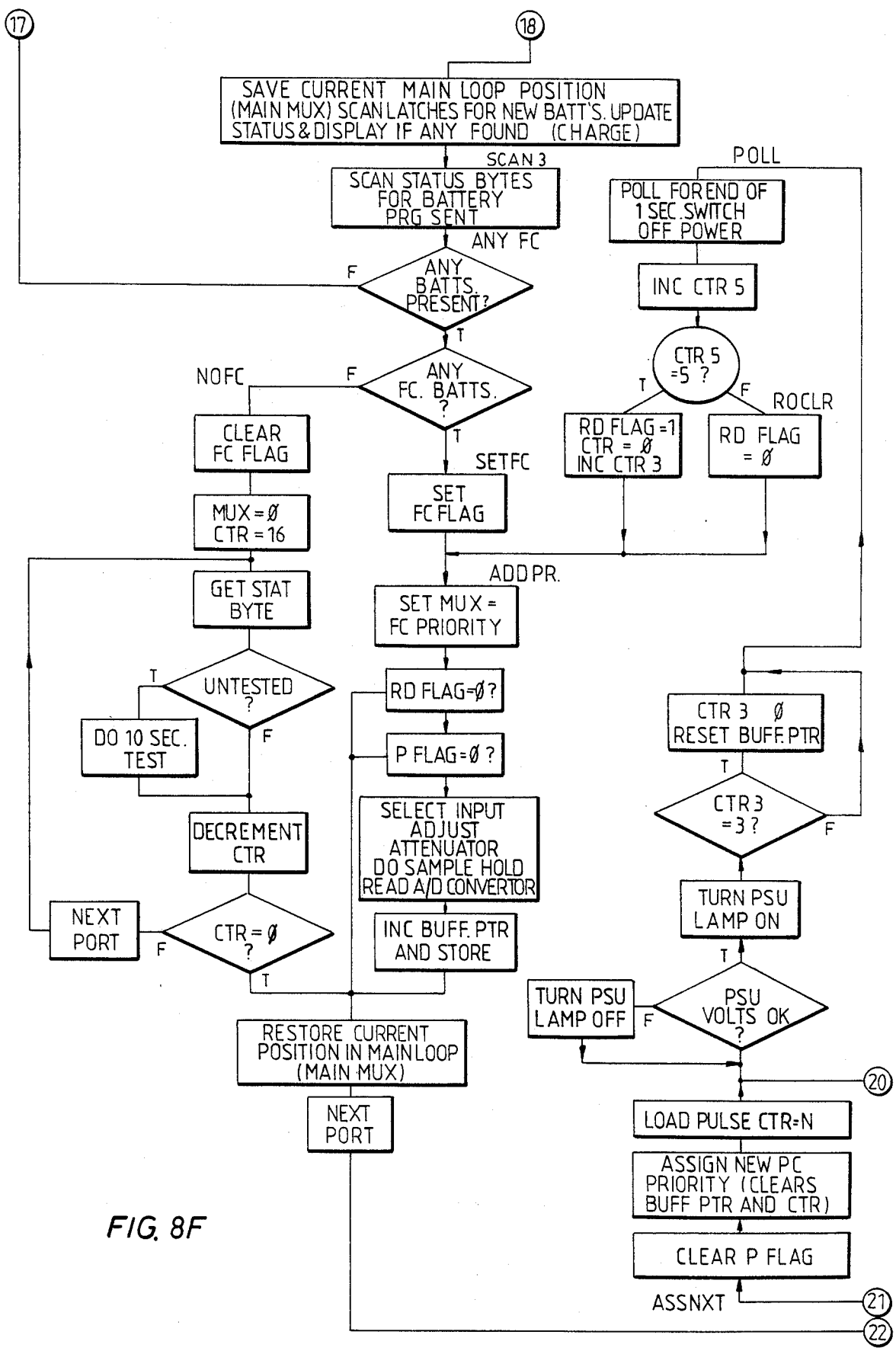
Figure 8G:
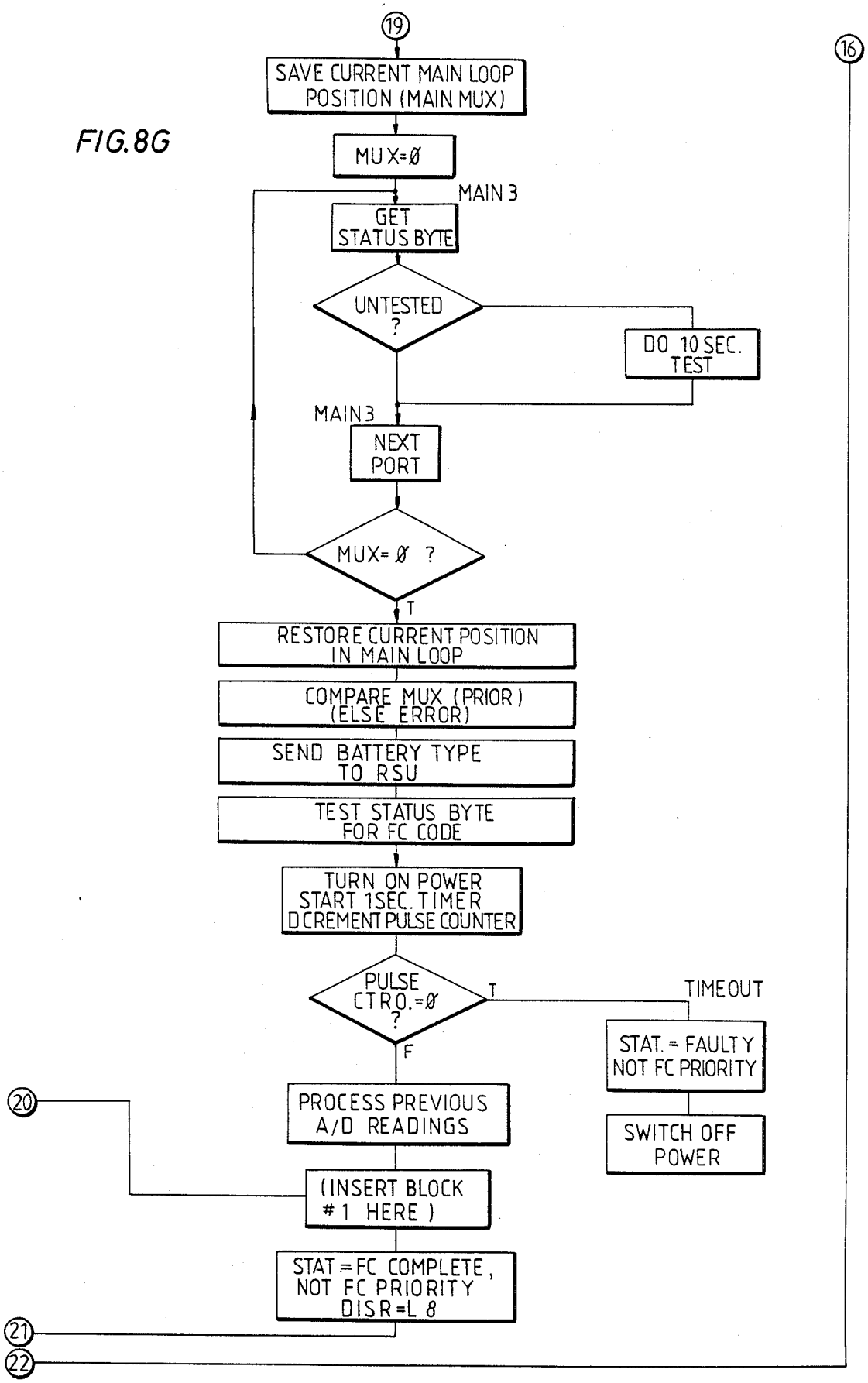

FIGS. 7A–B illustrate generally a block diagram of programming of a microprocessor which is suitable for use with the present invention.

FIGS. 8A–G illustrate in greater detail the programming indicated in FIG. 7.

Figure 9B:
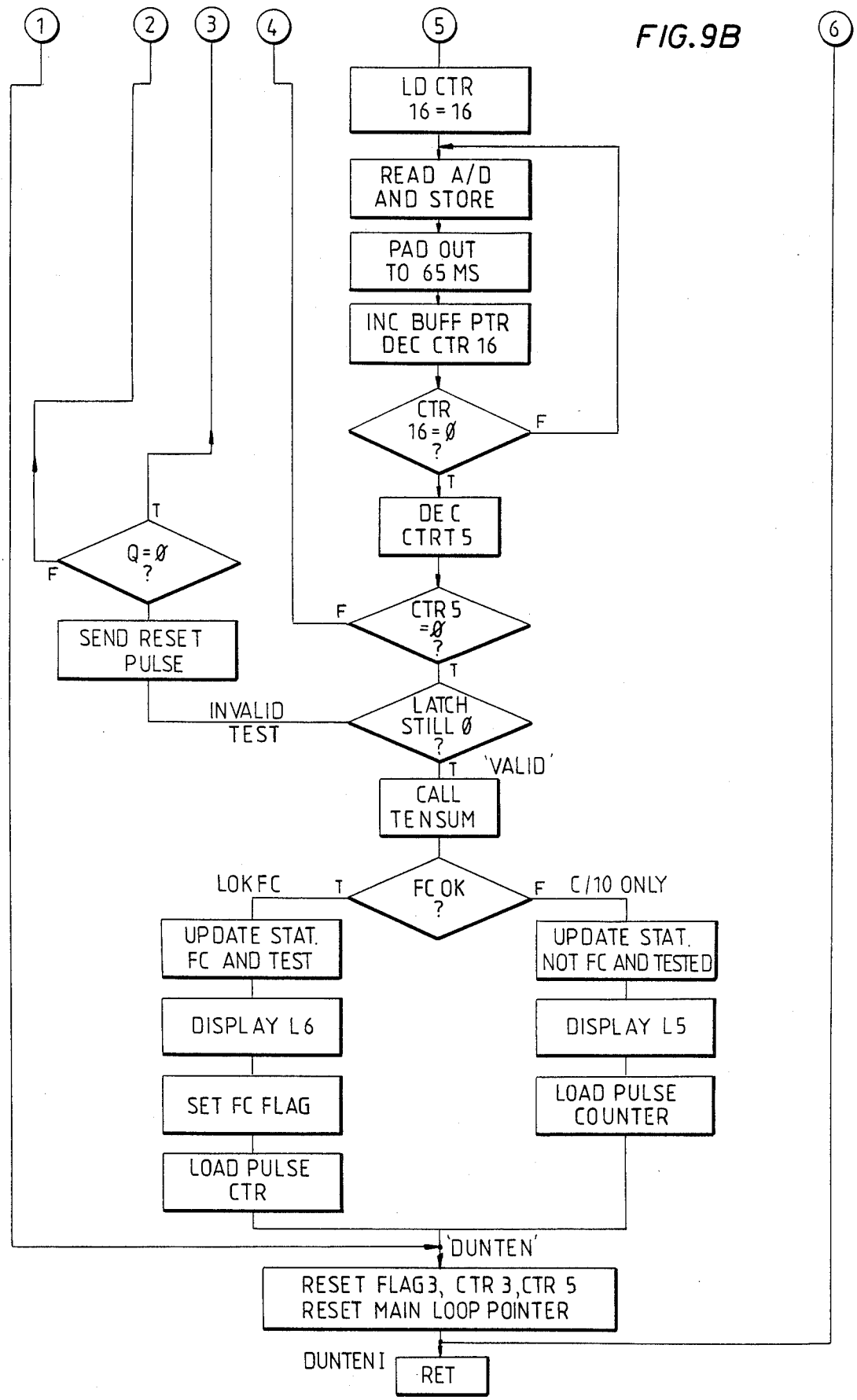

FIGS. 9A–B illustrate generally a subroutine for performing the "ten second test" suitable for use with the programming illustrated in FIGS. 7A–B and 8A–G.

Figure 1:
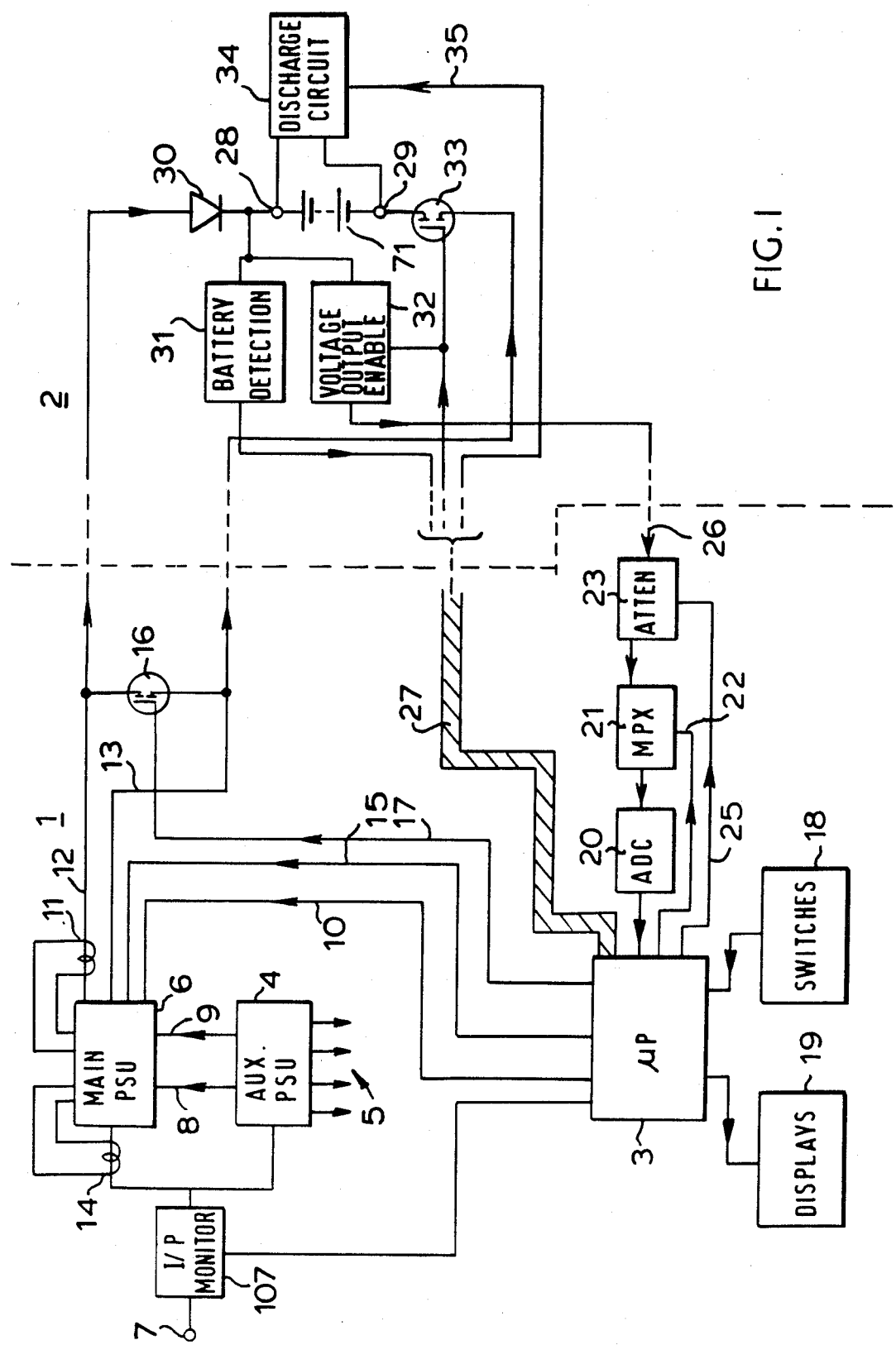
FIG. 1 is a schematic block diagram of a battery charger constituting a preferred embodiment of the invention.

The battery charger shown in FIG. 1 comprises a power supply and processing circuit 1, shown to the left of the broken line, and a plurality of battery ports, only one of which is shown to the right of the broken line in FIG. 1 indicated by reference numeral 2. In particular, the preferred battery charger comprises sixteen battery ports, three of which are conditioning ports of the type illustrated in FIG. 1 and the remainder of which are ordinary battery ports which differ from the conditioning ports by omission of the discharge circuit as will be described hereinafter.

The power supply and processing circuit 1 comprises a microprocessor 3 for controlling all of the operations of the battery charger, an auxiliary power supply 4 for powering all of the electronic circuits of the battery charger from power supply lines 5, and a main power supply 6 for supplying current pulses to charge the batteries connected to the battery ports 2. The power supplies 4 and 6 are of the switched-mode stabilizing type and receive DC input power from a supply input terminal 7. The auxiliary power supply 4 provides voltage-stabilized outputs for the electronics whereas the main power supply 6 is current-stabilized. The main power supply 6 is slaved to the auxiliary power supply 4 and receives synchronization pulses and a voltage reference signal on lines 8 and 9, respectively.

Figure 5:
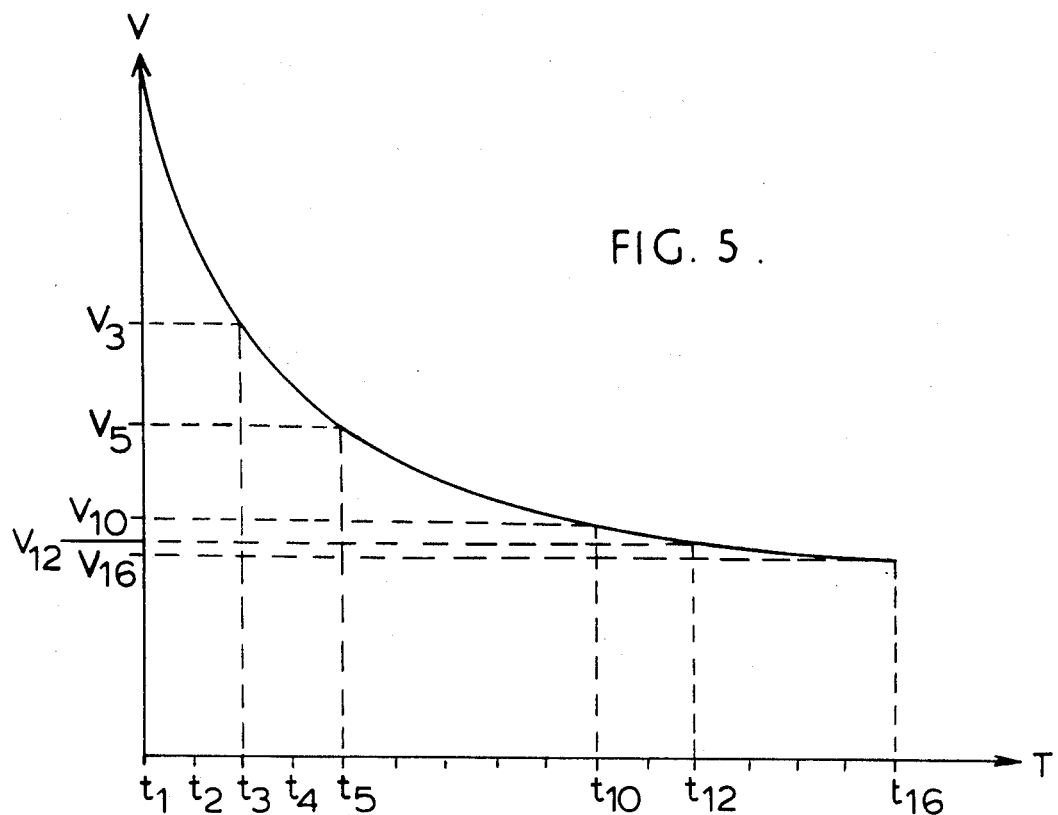
FIG. 5 is a graph illustrating operation of the battery charger of FIG. 1.

The main power supply 6 includes an isolating or "inverting" transformer which, because the power supply switching frequency is relatively high, may be of compact construction. This power supply transformer is preferably wound from screened or coaxial lead with the screen and core forming the primary and secondary, or secondary and primary, windings respectively. Such an arrangement reduces the leakage inductance of the transformer and thus substantially reduces the voltage spikes caused by the switching action of the power supply and to which the switching semiconductors would otherwise be subjected. Accordingly, switching semiconductors of lower ratings may be used and/or the stress on the switching semiconductors may be reduced. In a preferred embodiment, the switching semiconductors comprise power MOSFET devices mounted as will be described hereinafter with reference to FIG. 5 of the drawings.

The main power supply 6 provides current pulses of constant amplitude, whose value is selectable by the microprocessor 3, according to the capacity of the battery being charged, by means of a control line 10. Selection of the amplitude is preferably controlled in response to the position of a microswitch for each battery port which is controlled by the size of battery connected to the port. The microswitches may be similar to or ganged with the microswitch of the conditioning ports to be described hereinafter. Current stabilization of the main power supply is achieved by means of a negative feedback loop in which the current-sensing element is a current transformer 11 in one of the output leads 12 of the main power supply 6. The use of a current transformer 11 allows the output leads 12 and 13 of the main power supply to be floating while providing isolation for the stabilizing circuitry in the power supply. This avoids the need for other isolating components, such as opto-couplers.

A further current transformer 14 is provided in the input lead to the main power supply 6, since the current supplied to the main power supply is pulsed at the switching frequency of the power supply. This current transformer 14 supplies to the electronics of the main power supply a signal dependent on the amplitude of each input current pulse and is used to shut down the main power supply if excessive current is drawn, indicating a fault in the main power supply.

The microprocessor 3 controls the pulsed current output of the main power supply 6 by means of a control line 15. The microprocessor further controls a power field effect transistor 16, by means of a control line 17, which field effect transistor shorts the output leads 12 and 13 of the main power supply 6 during the space between the production of current pulses. This prevents the appearance of "phantom" batteries, which might upset the voltage measurement made between charging pulses as described hereinafter and might result in charging pulses being supplied to non-existent batteries.

The input power supply voltage from the terminal 7 is monitored by an input monitor 107 which provides the microprocessor 3 with a logic signal of +5 v or 0 v, depending on whether or not the input power supply voltage is within acceptable limits. In particular if the input voltage falls below a predetermined usable value, the microprocessor disables the main power supply 6 so as to prevent charging of the batteries but allows the remainder of the electronics to continue to function. An indication that the power supply voltage is outside acceptable limits is provided by means of a light emitting diode (not shown) which is normally continuously illuminated to indicate correct operation of the battery charger but which is flashed by the microprocessor 3 when the input voltage is too low.

The microprocessor 3 is of the stored program type and may comprise a "single chip" microprocessor having integral read only memory storing the processor program or provided with separate read only memory. The microprocessor 3 is connected to a set of three switches 18, each of which is associated with a respective battery conditioning port 2 and controls whether this port operates in a conditioning or charging mode. The microprocessor 3 is further connected to a set of displays 19 comprising three 7-segment LED displays or "Go/No Go" LED displays associated with the conditioning ports and sixteen sets of 3 LED displays associated with the sixteen battery ports. The information conveyed by the set of displays 19 will be described hereinafter.

The microprocessor 3 has an input connected to the output of an analog-to-digital converter 20, whose input is connected to the output of an analog multiplexer 21. The multiplexer 21 is controlled by a control line 22 from the microprocessor and has a first input connected to the output of a controllable attenuator 23 and a second input (not shown) for receiving the output from battery temperature detection circuitry, which is optional and is not shown in the drawings.

The attenuator 23 is controlled by an output line of the microprocessor 3 to select an attenuation value appropriate to the voltage of the battery being charged. The input of the attenuator 23 is connected to all of the battery ports by a line 26.

The microprocessor 3 has a bi-directional bus 27 connected to all of the battery ports for controlling the state of the battery ports and for receiving information about battery connection from the ports. In particular, the microprocessor 3 supplies selection signals to the ports as will be described hereinafter.

The battery conditioning port 2 shown in FIG. 1 comprises positive and negative battery connection terminals 28 and 29 for connection to a battery 71 to be charged. The positive terminal 28 is connected to the power supply line 12 by a diode 30 and to the inputs of a battery detection circuit 31 and a voltage output enable circuit 32. The negative terminal 29 is connected via the source-drain path of a power field effect transistor 33 to the main power supply output line 13. The "enable" input of the voltage output enable circuit 52 and the gate of the field effect transistor 33 are connected to a port enable line of the bus 27. The output of the voltage enable circuit 32 is connected to the input line 26 of the attenuator 23, whereas the output of the battery detection circuit 31 is connected to an input line of the bus 27. A discharge circuit 34 is connected between the terminals 28 and 29 and has a control input connected via a line 35 to a control line of the bus 27. In the case of a battery port which is not a conditioning port, the discharge circuit 34 and the line 35 are not provided.

Figure 2:
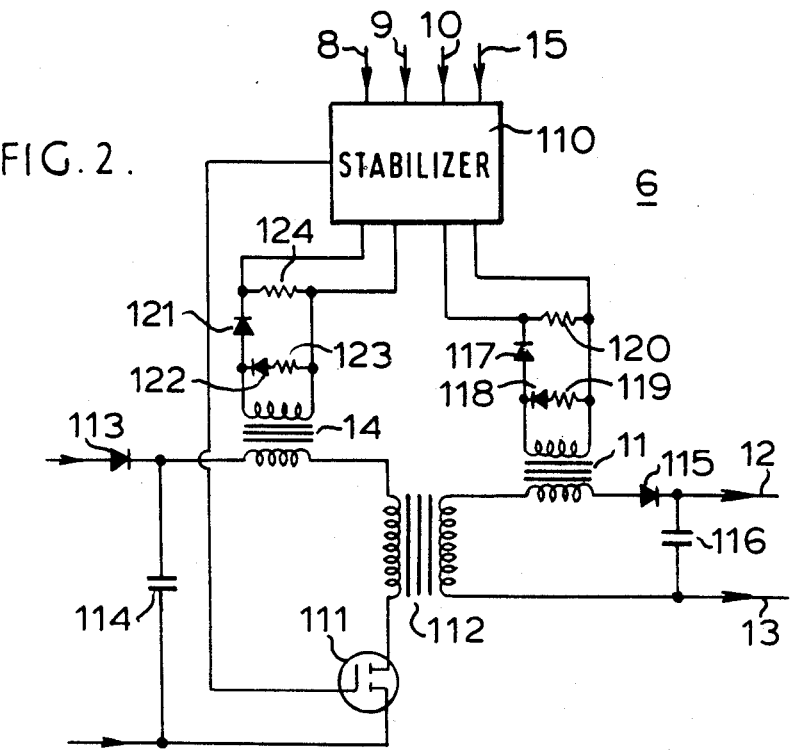
FIGS. 2 to 4 are circuit diagrams of parts of the battery charger of FIG. 1.
Figure 4:
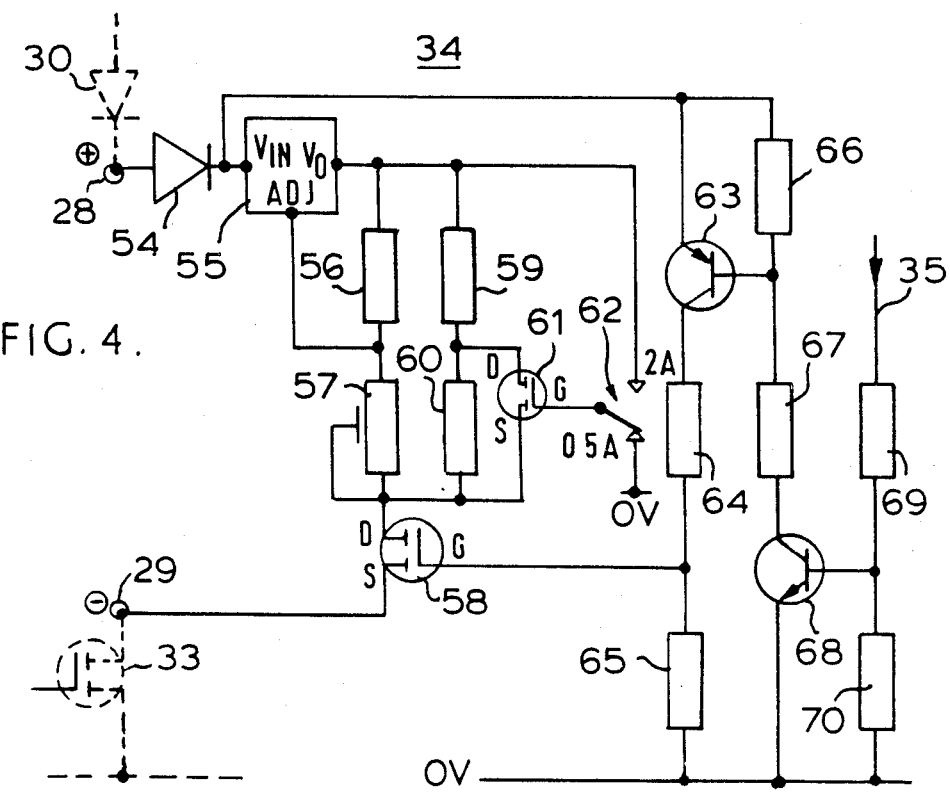
Figure 3:
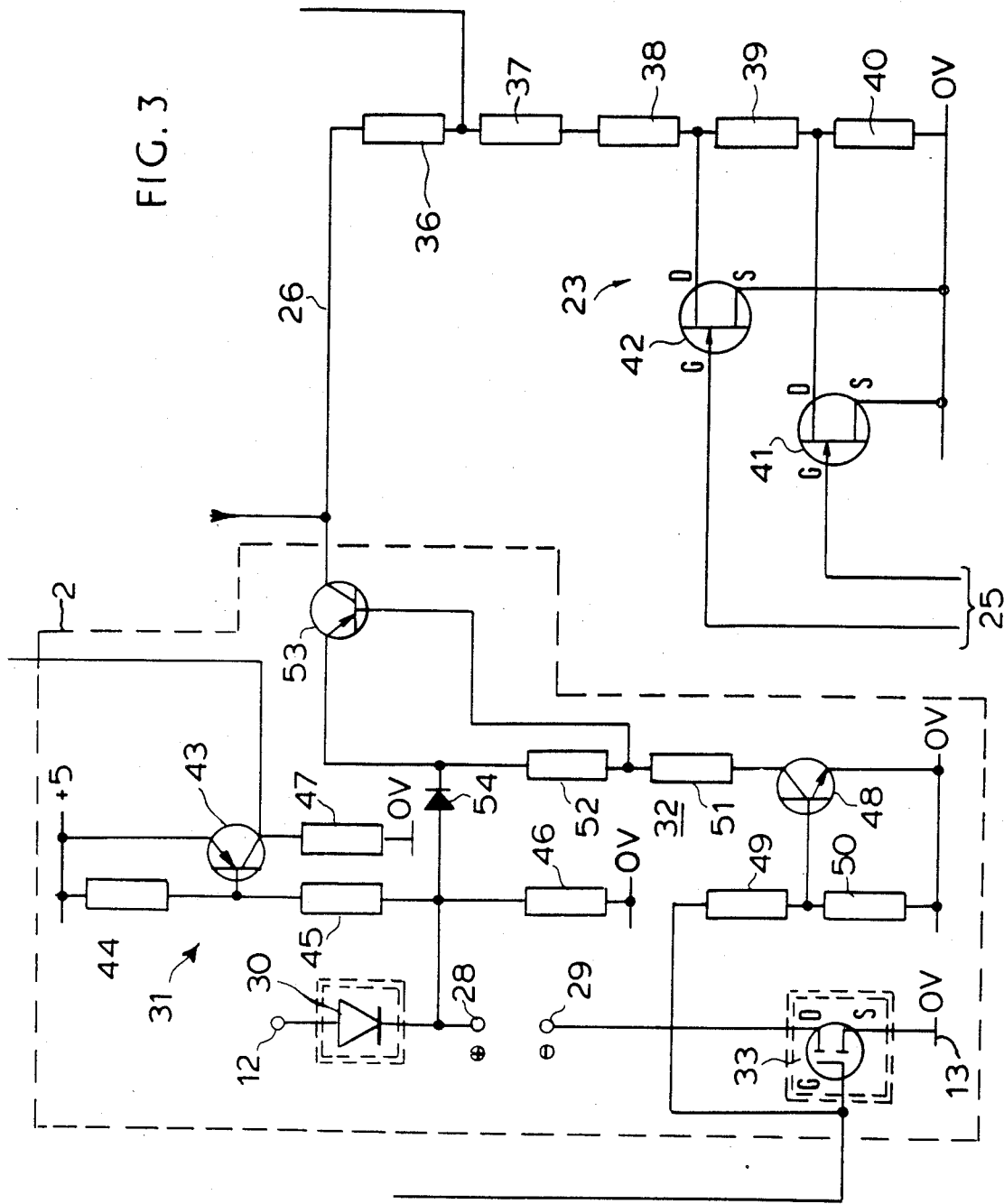

FIG. 2 shows a more detailed circuit diagram of the main power supply 6. FIG. 3 shows the detailed circuit diagram of one of the battery ports other than a conditioning port. The additional circuitry for a conditioning port is shown in FIG. 4. The same reference numerals are used in FIGS. 1 to 4 to indicate the same components.

The main power supply 6 shown in FIG. 2 comprises a stabilizer circuit 110 which is controlled by the signals on the lines 8, 9, 10, and 15, and by the outputs from the current transformers 11 and 14, so as to produce current pulses of selected constant amplitude for battery charging. The stabilizer 110 contains an oscillator running at approximately 100 kHz whose output signal has its mark/space ratio altered in accordance with the control signals so as to perform the stabilization function and so as to set the desired current amplitude of the output pulses from the power supply 6. This signal is supplied to the gate of a power MOSFET 111 (in practice several MOSFET's connected in parallel), which acts as a switch in series with an isolating transformer 112. Input power for the power supply is supplied via a rectifier diode 113 and is smoothed across a reservoir capacitor 114. The connection between the capacitor 114 and the primary winding of the transformer 112 contains the primary winding of the current transformer 14.

The output current from the transformer 112 is supplied, via the primary winding of the current transformer 11, to a rectifier 115 and is smoothed by means of a smoothing capacitor 116.

The secondary winding of the current transformer 11 is connected to an arrangement comprising diodes 117 and 118 and resistors 119 and 120 which select the appropriate part of the waveform from the current transformer 11 for use in the stabilizer in order to provide feedback regulation of the output current of the power supply 6. Similarly, diodes 121 and 122 and resistors 123 and 124 perform the same function in respect of the output signal from the secondary winding of the current transformer 14.

FIG. 3 shows the attenuator 23, which is common for all the battery ports. The attenuator comprises a potential divider formed by a resistor 36 and a plurality of tail resistors 37 to 40. The drain-source path of a field effect transistor 41 is connected across the resistor 40 whereas the drain-source path of a field effect transistor 42 is connected between a common zero volt line and the connection between the resistors 38 and 39. The gates of the field effect transistors 41 and 42 form the control line 25 from the microprocessor 3. The microprocessor controls the attenuator 23 by selectively switching on the transistors 41 and 42 so as to alter the attenuation according to the voltage of the battery connected between the terminals 28 and 29, so as to ensure that the voltage supplied via the multiplexer 21 is within the operating range of the analog-to-digital converter 20.

The battery detection circuit 31 comprises a PNP transistor 43 whose base is connected via a potential divider comprising resistors 44 and 45 to the terminal 28, which is also connected via a resistor 46 to the common line. The collector of the transistor 43 forms the output of the battery detection circuit, and is also connected to the common line via a resistor 47.

The voltage output "enable" circuit 32 comprises an NPN transistor 48 whose base is connected via a potential divider comprising resistors 49 and 50 to the gate of the field effect transistor 33. The collector of the transistor 48 is connected via resistors 51 and 52 to the emitter of a PNP transistor 53, whose base is connected to the connection between the resistors 51 and 52. The emitter of the transistor 53 is further connected via a diode 54 to the terminal 28. The collector of the transistor 53 is connected, together with the collectors of the corresponding transistors in all the other battery ports, to the input line 26 of the attenuator 23.

The discharge circuit shown in FIG. 4 comprises a diode 54 connected between the terminal 28 and an input terminal of an integrated circuit 3-terminal adjustable voltage regulator 55. The output of the regulator 55 is connected via a resistor 56 and an adjustable resistor 57 to the drain of a power field effect transistor 58, whereas the voltage-adjusting terminal of the regulator 55 is connected to the connection between the resistors 56 and 57. The output terminal of the regulator 55 is further connected via resistors 59 and 60 to the drain of the transistor 58. The drain-source path of a field effect transistor 61 is connected across the resistor 60, and the gate of this transistor is connected to the moving contact of a microswitch 62 having a first fixed contact connected to the common line and a second fixed contact connected to the output of the regulator 55. The microswitch 62 is arranged on a tray for receiving a battery to be charged by the battery port so that its moving contact is in the position shown in FIG. 4 for a battery of relatively low capacity, for instance 1 amp-hour. In this position, the source-drain path of the transistor 61 is of high impedance, so that the output current of the regulator 55 is constant and is set by the series combination of the resistors 59 and 60. However, when a battery of larger capacity, such as 4 amp-hours, is arranged on the tray, the micro-switch 62 is actuated to connect the gate of the transistor 61 to the output of the regulator 55, thus short circuiting the resistor 60 so that the current is set by the resistor 59. In a preferred embodiment, these currents are 0.5 amps and 2 amps for the positions of the switch 62 as indicated in FIG. 4.

The source of the field effect transistor 58 is connected to the terminal 29. The collector of a PNP transistor 63 is connected via resistors 64 and 65 to a common line, and the connection between the resistors 64 and 65 is connected to the gate of the field effect transistor 58. The emitter of the transistor 63 is connected to the input terminal of the regulator 55 and, via a resistor 66, to the base of the transistor 63. The base of the transistor 63 is further connected via a resistor 67 to the collector of an NPN transistor 68 whose emitter is connected to the common line. The base of the transistor 68 is connected to the output of a potential divider comprising resistors 69 and 70 connected between the control line 35 and the common line.

When a battery, in particular of the sealed nickel cadmium type, is connected to the terminals 28 and 29 with the correct polarity, the transistor 43 is turned OFF so that a zero voltage level is supplied from the battery detection circuit 31 to the microprocessor, which permits normal operation of the battery port 2. However, if no battery is present or if the battery is connected with its terminals reversed, then the transistor 43 is turned ON and supplies a signal of +5 volts to the microprocessor indicating that there is a fault. Thus, the microprocessor prevents the supply of charging pulses to the battery port until the fault condition is removed. The diode 54 isolates a reverse-connected battery from the voltage output enable circuit 32, so as to prevent damage thereto.

Each of the battery ports 2 is selected in turn by the microprocessor 3 by supplying a signal to the gate of the field effect transistor 33 so as to turn it ON to short-circuit the battery connection terminal 29 to the output line 13 of the main power supply 6. This signal also activates the voltage output enable circuit by turning ON the transistor 48, which thus biases the transistor 53 into conduction so as to supply at its collector a voltage corresponding to the voltage across the battery terminals 28 and 29 supplied by a battery being charged.

In the case of a conditioning port, when the conditioning mode is selected by one of the switches 18, the microprocessor supplies a signal on the line 35 to the discharge circuit 34 which turns ON the transistor 68, thus turning ON the transistor 63. This arrangement of common-emitter transistor amplifying stages provides effective voltage isolation of the discharge circuit from the microprocessor control lines, and also permits the discharge circuit to operate when the conditioning port is not currently selected by the microprocessor by means of the field effect transistor 33.

When the conditioning port is selected for conditioning, the transistor 63 turns ON the field effect transistor 58. Thus, a constant current whose value is dependent on the size of the battery cooperating with the microswitch 62 is withdrawn from the battery by means of the voltage regulator 55 via the diode 54, which also prevents damage to the discharge circuit if a battery is connected to the terminals 28 and 29 with incorrect polarity.

The battery charger shown in the drawings operates as follows.

The microprocessor 3 controls multiplexing of the battery ports 2 such that each port is activated in turn. During this multiplexing, one of the battery ports will have priority whereas the other ports merely supply a trickle charge to a battery, if connected to the port. The actual port which has priority at any one time is that which has had a battery to be charged connected thereto for the longest period.

Dealing first with the operation of the priority port in the case where the battery port is not a conditioning port, the initial connection of a battery 71 to be charged is signalled to the microprocessor 3 by the battery detection circuit 31 via the bus 27. Until the battery port is given priority, the microprocessor causes the main power supply 6 to supply trickle-charge pulses to the battery each time the multiplexing performed by the microprocessor selects the port by supplying a signal to the gate of the field effect transistor 33 to cause it to conduct. In a preferred embodiment, ten of the battery ports 2 are arranged to receive sealed nickel-cadmium batteries having a nominal terminal voltage of 12 volts and a capacity of 0.55 amp hours, four of the battery ports are arranged to receive sealed nickel-cadmium batteries having a nominal terminal voltage of 14.4 volts and a capacity of 4 amp hours, and two of the ports are arranged to receive sealed nickel-cadmium batteries having a nominal terminal voltage of 24 volts and a capacity of 4 amp-hours or 1 amp-hour. One of each of these types of battery ports is a conditioning port. The microprocessor 3 controls the main power supply 6 so that the battery ports for the batteries of 0.55 or 1 amp-hours capacity receive current pulses having an amplitude of 4.8 amps whereas the battery ports for batteries of 4 amp-hour capacity receive current pulses having an amplitude of 16 amps. The current priority port is activated for 1 second whereas the other ports are activated in order during a 1 second interval before the next activation of the priority port. Each of the other battery ports receives a current pulse whose duration is such as to provide an average current equal to the capacity of the battery in amp-hours divided by ten in accordance with normal trickle-charging requirements.

When the battery port under consideration becomes the priority port, an initial test lasting 10 seconds is performed so as to determined whether the battery is acceptable for fast charging. This 10 second test comprises five identical cycles of 2 seconds, in each of which a charging pulse is supplied by the main power supply 6 for a duration of 1 second and, during the 1 second interval following this pulse, the off-load battery voltage of the battery is measured by means of the converter 20, the multiplexer 21, the attenuator 23 and the enable circuit 32. In particular, the microprocessor measures this voltage at sixteen equally spaced intervals, each measurement following the supply of a trickle-charge pulse to the other battery ports in turn. The decaying battery voltage during each 1 second interval has the form shown in FIG. 5 in which the ordinate represents battery voltage V and the abcissa represents time T. The decay of the battery voltage has been emphasised in FIG. 5 for the sake of clarity. The microprocessor 3 receives a parallel digital code from the converter 20 for each of the measurements at time increments $t_1, t_2, \ldots$ and, during the interval following the final current pulse of the initial test, forms the ratio of the voltage difference $(V_3-V_5)$ to the voltage difference $(V_{10}-V_{12})$ and compares this ratio with predetermined maximum and minimum acceptable limit values. Alternatively, the ratio $(V_1-V_2)$ to $(V_3-V_{16})$ or $(V_2-V_4)$ to $(V_5-V_{16})$ may be used. If this ratio falls outside the acceptable range between these limit values, the microprocessor 3 rejects the battery for fast charging, institutes trickle charging of the battery, and changes priority to the battery port whose battery was connected after this battery.

If the ratio falls within the acceptable range, then the microprocessor 3 institutes fast charging of the battery by continuing to supply the above-mentioned current pulses having a duration of 1 second with a 1 second interval therebetween. During the 1 second interval between pulses, the microprocessor continues to monitor the decaying off-load voltage across the battery, either following each charging pulse or less frequently, and forms a sequence of ratios of the above-mentioned voltage differences. For a normal sealed nickel-cadmium battery, this ratio increases to a peak value and then falls as charging proceeds. Full charging of the battery is indicated by the ratio falling to a value which is a predetermined amount or proportion below the peak value of the ratios. Accordingly, the microprocessor examines the sequence of ratios to determined the peak value, and to determine when the value of the ratio has fallen by the predetermined amount or proportion below the peak value, in response to which fast charging of the battery is terminated and the battery then remains on trickle charge until it is removed from the battery charger. The predetermined amount or proportion may be stored in the microprocessor, for instance in the read-only memory thereof, or may be calculated by the microprocessor for each battery in accordance with the decaying voltage curve and the values of the ratios determined during the charging.

In the case of a conditioning port 2, a conditioning step is performed between the initial test and a further similar test if the corresponding one of the switches 18 is switched to select the conditioning mode. The conditioning step consists of discharging the battery at a constant rate, preferably at a constant current equal to the nominal capacity of the battery in amp-hours divided by 2, while monitoring the voltage across the battery terminals. When this voltage reaches a predetermined value, which is generally 1 volt per cell of the battery in the case of sealed nickel-cadmium batteries, the discharge of the battery is terminated and the further 10 second test, identical to the initial test is performed. If the further test is successful, the microprocessor 3 institutes fast charging of the battery as described above. The microprocessor counts the number of fast charging pulses supplied to the battery and, when the battery is determined to be fully charged in the way described above, causes the corresponding 7-segment display to give a single digit indication of the percentage charge of the battery (in units of 10 percent). Alternatively, the 7-segment display may be replaced by a light-emitting diode which is illuminated when the battery has been charged to at least 75 percent of its capacity, thus providing a relatively simple indication to an operator that the battery has been charged to an acceptable level. The battery is then placed on continuous trickle charge as described above until it is removed.

If the further test is not successful, "fault" is indicated and no further treatment of the battery takes place unless the port is switched out of the conditioning mode.

The use of fast changing pulses of relatively large current amplitude has various advantages over charging by direct current or by interrupted direct current. In particular, in nickel-cadmium batteries, it is possible for metal whiskers to form between the electrodes during charging, thus shorting the cell. However, the relatively high current pulses effectively burn up or melt such short circuit paths, thus improving the reliability of battery charging.

The microprocessor is further arranged to monitor, during fast charging, the voltage across the battery at a particular time increment following each current pulse so as to provide an additional check for ending the fast charging regime. In general, the microprocessor monitors the final voltage level $V_{16}$ following each current pulse, which voltage generally increases for each charging pulse until the battery has been fully charged, after which the voltage begins to decrease. If this voltage begins to fall before the above-mentioned test of the ratio of voltage differences has indicated that fast charging should cease, then the microprocessor stops the fast charging of the battery and switches it to trickle charging so as to prevent damage caused by over-charging the battery, which is considered to be in an acceptable condition.

As a further safety feature, the number of fast charging pulses supplied to the battery is counted by the microprocessor and fast charging is ceased if a predetermined number of such pulses, or if a predetermined fast charging period, has been reached and neither of the above-mentioned tests has stopped the fast charging. If this period is reached, the battery is indicated as faulty. Thus, even if a fault condition arises, the battery cannot be over-charged.

If the initial or further test rejected the battery for fast charging, then, as mentioned above, the battery is subjected to continuous trickle charging at a rate equal to one tenth of its capacity in amp-hours. After fourteen hours of trickle charging, an indication is given that the battery has been fully charged, but the battery remains on trickle charge until it is removed.

As mentioned above, each battery port has associated with it three light-emitting diodes which indicate the current state of the battery and the mode of operation of the battery port. In a preferred embodiment, these light-emitting diodes comprise an amber LED, a green LED and a red LED. In the absence of a battery connected to the terminals of the battery port, all three light emitting diodes are of OFF. Continuous illumination of the amber diode represents trickle charging of the battery and flashing of the amber diode indicates that charging is complete and the battery may be removed. Continuous illumination of the red diode indicates that the battery is awaiting or undergoing the initial test, and continuous illumination of the green diode indicates that the battery has been accepted for and is awaiting fast charging, or is under fast charge. Flashing of the green diode indicates that fast charge has been completed and that the battery may be removed. Flashing of the red diode indicates that a fault has occurred or that charging of the battery has been terminated by detecting the supply of the predetermined number of charging pulses, so that the battery should be removed. In the case of the conditioning ports, continuous illumination of the red and green diodes indicates that the battery has been accepted for fast charging and is undergoing the discharge of the conditioning step, whereas continuous illumination of the red and amber diodes indicates that the battery was rejected for fast charging but is undergoing the discharge of the conditioning step. In order to facilitate use of the battery charger, a dimming control is provided for dimming these light-emitting diodes, and preferably also the 7-segment displays. However, dimming will not normally be possible on the "power" indicator described hereinbefore.

The battery charger thus provides fast, efficient, and reliable charging of batteries which are serviceable, and also give an indication of the serviceability of the battery. The battery charger is particularly suitable for sealed nickel-cadmium batteries, although its application to other types of battery may be possible. The technique of monitoring the ratio of voltage differences described hereinbefore for the purpose of determining when fast charging of the battery should be terminated provides a reliable indication of battery charging, but other techniques based on the measurement of off-load battery voltage following charging pulses may also be possible, for instance in the case of batteries of other types.

Figure 6:
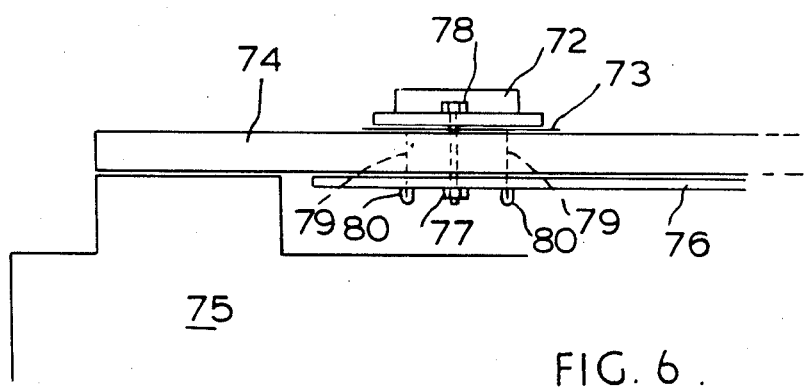
FIG. 6 illustrates a detail of the mechanical construction of the battery charger of FIG. 1.

FIG. 6 illustrates the mounting arrangement of power semiconductors in the battery charger, in particular, the switching transistors, which are preferably power MOS field effect transistors, in the power supply. In particular, the field effect transistor is contained in a TO3 package 72 provided with the usual mica washer 73 for insulating the case, which forms one of the circuit connections, from a heat sink 74. The heat sink 74 is fixed, for instance by means of bolts, to a chassis or chassis member 75 to provide good conduction of heat from the heat sink to the chassis.

A printed circuit board 76 is mounted against the face of the heat sink 74 on the opposite side to the transistor 72. Two nuts 77 are soldered and/or riveted, or fixed in any other suitable way, to the outer surface of the printed circuit board and receive bolts 78 for fixing the transistor to the heat sink and for providing an electrical connection in the usual way. These bolts pass through holes in the heat sink and are insulated and spaced therefrom by the usual insulating bushes. Two connection pins 79 also pass with clearance through corresponding holes in the heat sink 74 and in the printed circuit board 76 and are received in sockets 80 which are also fixed to the printed circuit board 76 for instance by means of soldering. Copper tracks on the printed circuit board 76 provide the connections to the terminals of the transistor 72 in the usual way.

The arrangement of the two nuts 77 and of the sockets 80 thus permits ready removal and replacement of the transistor 72. In particular, it is merely necessary to unscrew the bolts 78 and to pull the transistor away from the heat sink, as the pins 79 are received in the sockets 80 in a plug-and-socket manner. Thus, disassembly of the arrangement is not necessary to replace a faulty transistor during manufacture or service, greatly facilitating such operations and reducing the "downtime" of the battery charger. The arrangement does not impair the conduction of heat to the heat sink 72 and cooling is further improved by conduction of heat from the heat sink to the chassis 75.

Such an arrangement may be used in other applications for power semi-conductor devices and may also be used for semi-conductor packages other than of the TO3 type.

FIG. 7 illustrates programming of a microprocessor which is suitable for use with the present invention. This programming in FIG. 7 is described in greater detail in FIG. 8. FIG. 9 illustrates a programming subroutine for performing the "ten second test" which is suitable for use with the programming depicted in FIGS. 7 and 8. The programming depicted in FIGS. 7-9 is illustrative only and depicts only one possible method of practicing the invention and is not to be construed in any way as a limitation on the scope of the present invention.

We claim:

1. A method of charging a battery, comprising the steps of:
   (a) supplying a plurality of current pulses of a first type to the battery;
   (b) measuring the off-load voltage of the battery between current pulses of said first type;
   (c) determining a first voltage drop during a first period following a current pulse of said first type;
   (d) determining a second voltage drop during a second period following said current pulse of said first type of said step (c) but before a next current pulse of said first type, where the end of said second period is later than the beginning of said first period;

(e) determining the ratio of said first and second voltage drops;

(f) repeating said steps (c) to (e) for subsequent current pulses of said first type to form a sequence of ratios; and (g) stopping the supply of said current pulses of said first type after said sequence of ratios has reached a peak value and when a ratio is determined which is less than said peak value by a predetermined amount or proportion.

2. A method as set forth in claim 1, wherein said current pulses of said first type have an amplitude in amps equal to or greater than four times the capacity of the battery in amp-hours.

3. A method as set forth in claim 1, wherein each of said current pulses of said first type has a duration of one second with a space of one second between consecutive ones of said pulses.

4. A method as set forth in claim 1, wherein the end of said first period is before the beginning of said second period.

5. A method as set forth in claim 1, wherein the off-load battery voltage is determined at a predetermined time after each of said current pulses of said first type to provide a sequence of battery voltage values and the supply of said current pulses of said first type is stopped when the battery voltage value falls below a peak value of said sequence of battery voltage values.

6. A method as set forth in claim 1, wherein the supply of said current pulses of said first type is stopped after the supply of a predetermined number of said pulses.

7. A method as set forth in claim 1, wherein, after the supply of said current pulses of said first type has stopped, current pulses of a second type are supplied to the battery so as to perform trickle charging, said current pulses of said second type having the same amplitude as, but a smaller mark/space ratio than, said current pulses of said first type.

8. A method as set forth in claim 8, wherein the average current in amps of said current pulses of said second type is equal to one tenth of the capacity of the battery in amp-hours.

9. A method as set forth in claim 1, wherein an initial battery test is performed prior to performing said steps (a) to (g), said initial test comprising performing said step (a) to (e) for a predetermined number of current pulses of said first type and charging the battery if said ratio of said first and second voltage drops at the end of said initial test is between predetermined maximum and minimum limit values.

10. A method as set forth in claim 1, wherein a battery conditioning step is performed prior to performing said steps (a) to (g), said battery conditioning step comprising discharging the battery at a predetermined rate until a predetermined voltage per battery cell is reached.

11. A method as set forth in claim 10, wherein said predetermined discharge rate in amps is equal to half the battery capacity in amp-hours.

12. A method as set forth in claims 10, wherein, following said conditioning step, the number of current pulses of said first type supplied to the battery is counted to provide a measure of charging of the battery.

13. An apparatus for charging a battery, comprising: means for supplying current pulses of a first type to the battery; means for measuring the off-load voltage of the battery between said current pulses; and means for determining the first voltage drop during a first time period following each of at least some of said current pulses, for determining the second voltage drop during a second period following each of said at least some of said current pulses wherein the end of each said second period follows the beginning of each said first period, for determining the ratios of said first and second voltage drops, and for preventing said pulse supplying means from supplying said current pulses of said first type when the value of said ratio falls below a peak value of said ratios by a predetermined amount.

14. An apparatus as set forth in claim 13, wherein said pulse supplying means comprises a switched-mode power supply circuit arranged to supply current pulses of constant amplitude.

15. An apparatus as set forth in claim 14, wherein said power supply circuit has an output line and a current-stabilizing negative feedback loop including a current transformer in said output line.

16. An apparatus as set forth in claim 14, wherein said power supply circuit has a direct current input line and a current transformer in said input line for supplying a power supply shut-down signal when excessive input current is detected.

17. An apparatus as set forth in claim 14, wherein said power supply circuit includes an isolating transformer provided with primary and secondary windings each of which is made of screened lead having a core and a screen, said primary winding comprising one of said core and said screen and said secondary winding comprising the other of said core and said screen.

18. An apparatus as set forth in claim 13, wherein said determining means comprises a microprocessor, and said measuring means comprises an analog-to-digital converter connected to said microprocessor, and wherein said apparatus further includes a common line and an electronically switchable attenuator connected to the input of said converter and comprising a potential divider having a plurality of tail resistors selectively shortable to said common line by electronic switch means controlled by said microprocessor.

19. An apparatus as set forth in claim 13, including a battery discharging circuit for selectively discharging the battery at constant current.

20. An apparatus as set forth in claim 19, wherein said discharging circuit comprises a voltage regulator whose output is connected across a resistor for setting said constant current.

* * * * *